United States Patent

Barkowski et al.

[11] Patent Number: 4,754,148
[45] Date of Patent: Jun. 28, 1988

[54] ADJUSTABLY POSITIONED APPARATUS MAINTAINING A FIXED PERPENDICULAR DISTANCE FOR EVALUATING A CURVED SURFACE

[75] Inventors: Lawrence R. Barkowski, Natrona Heights; Yeong-U Kim, Export; Richard Kazeva, New Kensington, all of Pa.

[73] Assignee: Allegheny Ludlum Corporation, Pittsburgh, Pa.

[21] Appl. No.: 939,995

[22] Filed: Dec. 10, 1986

[51] Int. Cl.⁴ .................... G01N 21/86; G01N 21/55; G01V 9/04; H01J 5/02
[52] U.S. Cl. ................................. 250/571; 250/239; 356/445
[58] Field of Search ............... 250/572, 562, 570, 234, 250/239, 223 B, 571, 563; 356/240, 445–448

[56] References Cited

U.S. PATENT DOCUMENTS

| | | | |
|---|---|---|---|
| 3,403,263 | 9/1968 | Hargens, III | 250/563 |
| 3,549,264 | 12/1970 | Christie | 356/210 |
| 3,667,846 | 6/1972 | Nater et al. | 250/572 |
| 4,053,237 | 11/1977 | Casey | 356/445 |
| 4,079,261 | 3/1978 | Mullin | 250/239 |
| 4,099,884 | 7/1978 | Nash | 250/572 |
| 4,410,278 | 10/1983 | Makihira et al. | 356/445 |
| 4,450,359 | 5/1984 | Röss et al. | 250/572 |
| 4,555,635 | 11/1985 | Yoshida | 250/572 |
| 4,606,645 | 8/1986 | Matthews et al. | 250/562 |

Primary Examiner—David C. Nelms
Assistant Examiner—Michael Messinger
Attorney, Agent, or Firm—Patrick J. Viccaro

[57] ABSTRACT

An apparatus and method for quantitatively evaluating the finish of a curved surface of a rolling mill roll or a coil of strip. A light beam is directed by the position of a support housing at a specific incident angle onto the curved surface and a plurality of light detectors are positioned by the support housing above the curved surface for measuring the intensity of reflected light in various directions as defined by the positions of the light detectors. The housing is positioned by stabilizing arms at opposite sides of the housing so that the housing and stabilizing arms form three points of contact with the curved surface. A roller with journals at opposite ends is supported by each stabilizing arm. The longitudinal axes of the rollers are parallel to the longitudinal axis of the roll or coil of strip so that the light beam travels in a plane which is also parallel to longitudinal axis of the roll or coil of strip. An electrical circuit is coupled to the light detectors for calculating the value of specular reflectance as well as reflected light at various angles thereto.

11 Claims, 2 Drawing Sheets

ADJUSTABLY POSITIONED APPARATUS MAINTAINING A FIXED PERPENDICULAR DISTANCE FOR EVALUATING A CURVED SURFACE

BACKGROUND OF THE INVENTION

1. Field of the Invention

The invention relates generally to non-destructive inspection of a curved light reflective surface and more particularly, to a means for quantitatively evaluating the quality of the finish of a curved surface such as the body portion of a rolling mill roll; a coil convolution of metal strip; or an arc of strip length wrapped around a guide roll or a billy roll.

2. Description of the Prior Art

Rolling of metal in a rolling mill is an essential process for producing many steel products sold in strip or sheet form. Vitally important to the quality of the steel product is the surface appearance because it is an essential factor to the ornamental or esthetic appearance of items produced from the rolled product. The surface quality of stainless steel strip is usually given special attention. Surface imperfections on the roll body contacting the surface of the product during a rolling operation is transmitted to a surface of the rolled product. Thus, the surface quality of the finished product is inherently dependent upon the quality of the body surface of the rolling mill rolls, particularly the work rolls.

It is a common practice to change work rolls in a mill stand or final one or more mill stands of a tandem rolling mill on the basis of the tonnage of product rolled by the particular set of work rolls in the mill. This procedure is based on the assumption that the refurbished surface of newly replaced work rolls after each roll change will deteriorate to the same extent based on previous experience. Presently, the only method of evaluating the quality of the roll surface is by visual inspection thereof by trained personnel at either a roll finishing shop or at the mill site. Such a visual evaluation, however, does not constitute an objective and quantitative method of inspection, and, inherently allows variations in the finish of the work roll, which, in turn, allows variations in the quality of the finished product.

Because the quality of the roll surface is such an important factor to the appearance of the finished product, inspection of the roll body surface should be carried out before start up with a replacement roll or periodically after roll changing. Periodical evaluation of the work-roll surface and/or surface of the rolled product will provide an effective measure to ensure that the roll body surface meets a quality standard.

Disclosed in U.S. Pat. No. 3,549,264 is a goniophotometric instrument for providing quantitative values indicative of smoothness of metallic surfaces. The instrument determines values of specular reflectance, distinctness of image, and haze, of light reflected from a metallic surface, each of the values being indicative of the smoothness of the surface. A goniophotometer sold under the name DORIGON by Hunter Lab. of Fairfax, Va. operates in a manner similar to the instrument disclosed in the aforesaid U.S. Pat. No. 3,549,264 to provide appearance measurements based on angular resolution of a reflected image. A circular light spot is emitted from a light shaping orifice toward a specimen which can be held by clamps forming part of the instrument. However, the instrument can be adhered to a specimen surface by magnets. Because light must be reflected from a metallic surface by the instrument, it cannot be viewed at a proper position relative to a curved surface, such as the surface of a roll, the outer convolution of a coil of strip or an arc of strip length wrapped around a guide roll or a billy roll.

It is, therefore, an object of the present invention to provide a method and apparatus for quantitatively evaluating appearance characteristics of a curved metallic surface.

It is a further object of the present invention to provide a method and apparatus for measuring the values of specular reflectance, distinctness of image, and haze, of light reflected in a plane from a curved surface generally parallel to the longitudinal axis of the curved surface.

It is a still further object of the present invention to provide a mounting means allowing stable positioning of an apparatus for evaluating a curved reflective metallic surface.

SUMMARY OF THE PRESENT INVENTION

According to the present invention, there is provided an apparatus for inspecting a curved surface at a generally uniform distance from a central axis of the curved surface, the apparatus including, mounting members engageable along each of spaced apart tangent planes with the curved surface, the tangent planes being generally parallel to the central axis, light producing means positioned by the mounting members above the curved surface for emitting a light beam at a predetermined incident angle onto the curved surface, light detecting means positioned by the mounting members for measuring the intensity of specular light reflected at a predetermined incident angle by the curved surface from the light producing means, and the means responsive to an output signal by the light detecting means for producing electrical signals correspondent thereto.

Further, according to the present invention, there is provided a method for quantitatively evaluating the quality of a curved surface spaced at a generally uniform distance from a central axis, the method including the steps of directing a light beam within a plane generally parallel to the central axis at a predetermined incident angle onto the curved surface, positioning a plurality of sensors within a central plane generally parallel to the central axis above the curved surface to receive and measure the intensity of the reflected light beam by the curved surface at a plurality of sites defined by the positions of the plurality of sensors within the central plane, producing a plurality of electrical signals corresponding to the ratios of the intensity of the reflected light incident on the sensors, and selectively displaying the electrical signals.

BRIEF DESCRIPTION OF THE DRAWINGS

The invention may be better understood and further advantages and uses thereof more readily apparent when considered in view of the following detailed description of exemplary embodiments taken with the accompanying drawings in which.

DESCRIPTION OF THE PREFERRED EMBODIMENT

Figure 1:
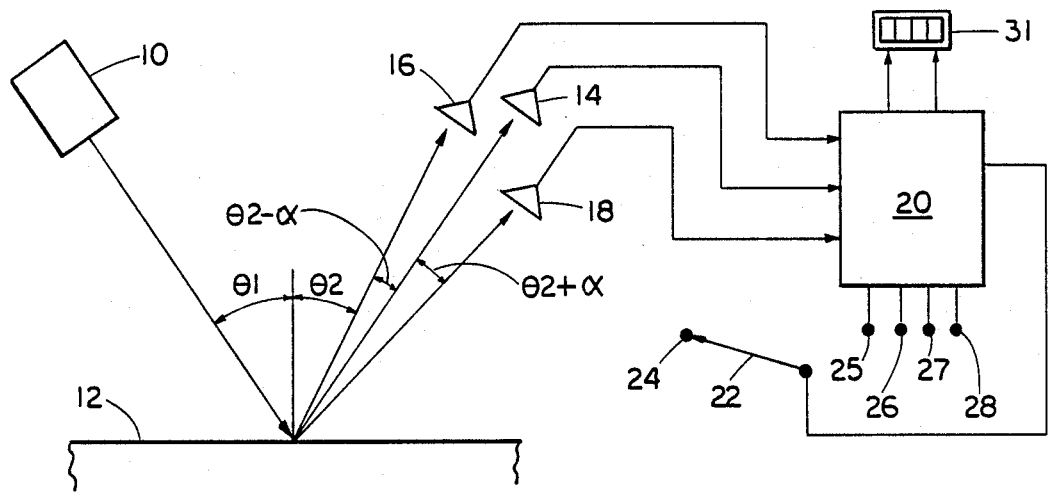
FIG. 1 is a schematic illustration of the operation of the surface quality meter incorporated in the present invention.

Referring now to FIG. 1, there is shown schematically the principles embodied in the surface quality meter used for evaluating the quality of the finish of a curved surface which can be, for example, the outer wrap of a coiled strip, the arc length of strip wrapped over the guide roll of the strip processing line, or the roll body surface of a roll for a rolling mill. In general, a light producing means 10, such as, for example a halogen quartz lamp, is positioned above a curved metal surface 12 of a roll or coiled strip. The light produced by means 10 is projected onto the surface 12 at a specific incident angle, $\theta 1$, and at a specific initial intensity. The light producing means, preferably, includes light beam shaping plate having a slit or rectangular opening so that the emitted light beam has a correspondingly shaped spot at the point of inpingement with surface 12. The length of the slit or elongation of the rectangular opening is in the direction of the central axis of the curved surface 12. In the ideal case in which the surface 12 acts as a perfect mirror, the light beam is reflected at an angle $\theta 2$ equal in magnitude to the incident angle, $\theta 1$. Angle $\theta 2$ defines the specular direction. The intensity of the specular reflected light from a perfect mirror is equal in magnitude to the intensity of the incident light beam. In actuality, however, surface 12 is not a perfect mirror and due to surface texture, only a portion of the incident light beam is reflected in the specular direction. The remainder of the reflected light is reflected in a plurality of directions other than 82 in the plane of incidence and viewing perpendicular to the surface. The plurality of directions are defined as $\theta 2 + \alpha$ or $-\alpha$ and can be measured to evaluate the configuration of the metallic surface when $\alpha$ is a small angle up to 15 degree, preferably up to 5 degree. The light reflected in the specular direction is therefore of a lesser intensity than the intensity of the incident light beam. By placing a detector 14 in the specular direction, the intensity of the light beam reflected in this direction may be measured. Similarly, by placing light detectors 16 and 18 in directions other than the specular direction, the intensity of the light beam reflected in these directions may similarly be measured. Electric signals produced by detectors 14, 16 and 18 are delivered by individual feed lines to electric circuitry 20 which includes a selector switch 22. Switch 22 can be moved to any one of contacts 24, 25, 26, 27, and 28, which represent desired outputs, such as respectively, OFF, specular reflectance (Rs), and Haze @ 2 degree, @ 5 degree, and @ 15 degree. A display 31 is connected to the circuit 20 to provide a quantitative display such as an alpha numeric display of measured quantities by one or more of the detectors as will be now explained in greater detail.

The intensity of the light reflected in the specular direction is referred to as the specular reflectance, Rs. The specular reflectance is measured by detector 14 and represents one quantitative measurement which may be used as an indicator of the smoothness of a metal surface as comparable to specular reflectance by a perfect mirror. Specular reflectance is obtained by moving switch 22 to a position for engaging contact 25, whereby circuit 20 provides an electrical signal to the display 31 corresponding to the output of detector 14. Preferably, a smooth surface 12 results in a greater value of specular reflectance than a rough surface because a rough surface disperses more light.

A further quantitative measurement which may be used as an indicator of the smoothness of the surface 12 is referred to as "Haze". This measurement compares the intensity of the light reflected in the specular direction with the intensity of the light reflected in directions defined by angles several degrees larger or smaller than $\theta 2$, i.e., with reference to the illustration of FIG. 1, directions defined by $\theta 2 + \alpha$ or $\theta 2 - \alpha$ in which $\alpha$, for example, takes on a predetermined angular value of 2 degree, 5 degree, or 15 degree. Preferably, the light reflected in the OFF-specular direction of 2 degree may be sufficient. The 15 degree value may be useful only for relatively rough surfaces. By positioning detector 14 in the specular direction and by positioning detectors 16 and 18 in the directions defined by $\theta 2 + \alpha$ or $\theta 2 - \alpha$, and by moving selector switch to positions for engaging successive controls 27 and 28, then circuit 20 applies electrical signals at the respective contacts corresponding to the ratio of the intensity of the light measured by detectors 16 and 18 to produce a quantitative measurement of 2 degree haze, 5 degree haze and 15 degree haze, for example.

Figure 2:
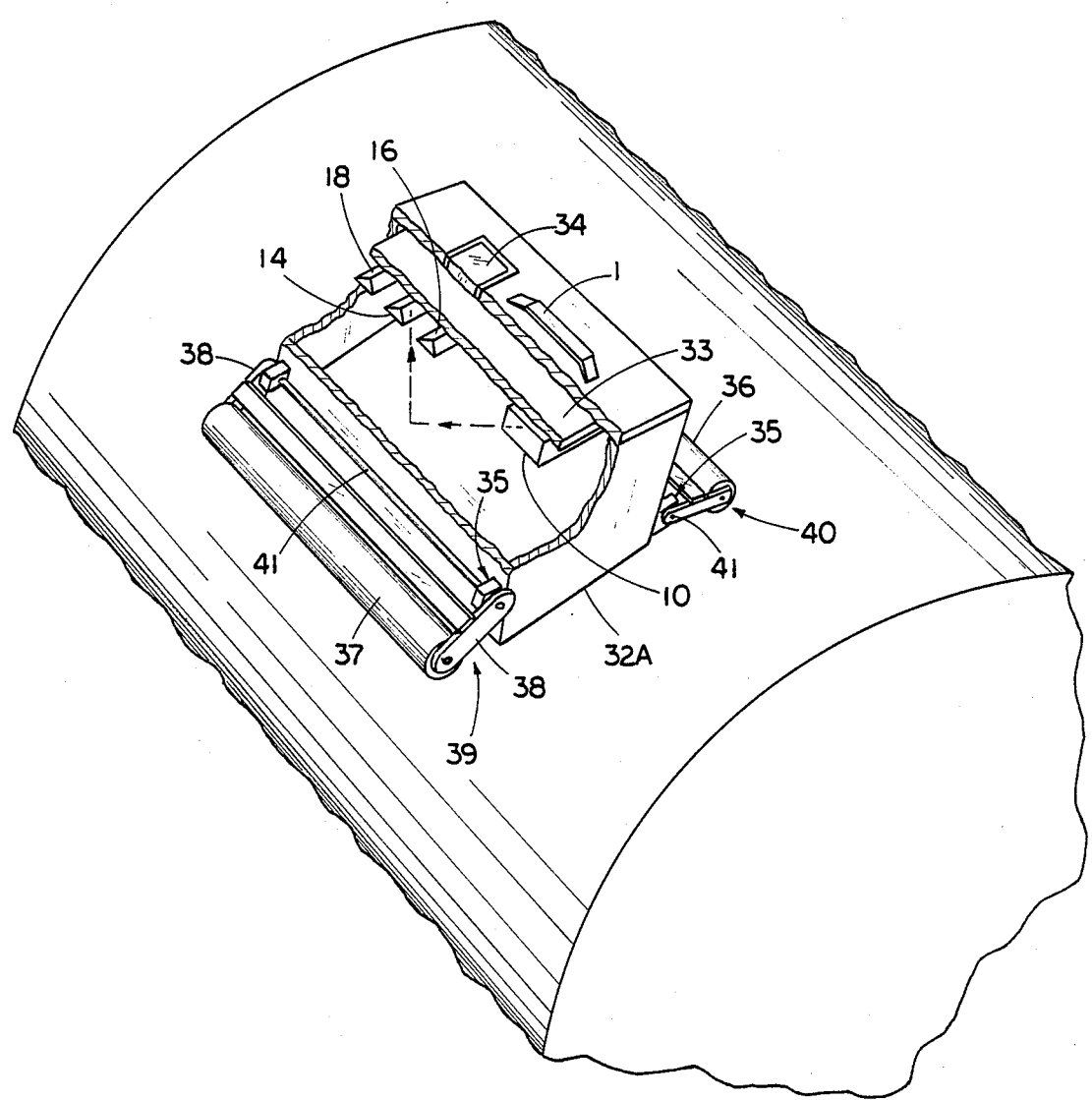
FIG. 2 is an isometric view of the embodiment of the apparatus of the present invention.

Referring now to FIG. 2, there is shown an isometric view of an embodiment of an apparatus of the present invention for evaluating the quality of a portion of a metal surface 12 forming part of a work roll body for a rolling mill. It is to be understood that surface 12 may comprise part of an exposed or outer convolution of a coil of strip. A housing 32 supports surface quality meter described hereinbefore and shown schematically in FIG. 1. Housing 32 supports a mounting fixture 33 on which there is supported the light producing means 10, the plurality of light detecting means 14, 16, and 18, the circuit 20 and switch 22. Display 31 is mounted in the top wall of the housing beneath a window 34 for visual readout of measured and calculated values representing surface quality. The display 31 may be located remote to the housing but electrically connected to the detectors supported in the housing.

Mounting means 35 are attached to opposite sides of the housing in a predetermined position on the curved surface 12 in order to allow the measurements necessary to evaluate the quality of the surface to be carried out. The mounting means include two elongated stabilizing rollers 36 and 37 having arbors at each of their opposite ends rotatably journaled in bored openings formed in spaced apart sections 38 of standoff arms 39 and 40. The standoff arms are secured by pivot shafts 41 to each of opposite sides of the housing 32 so that the light beam travels in a plane parallel to the rotational axis of the roll. The light beam undergoes specular reflection by the curved surface midway between the rollers 36 and 37. Rollers 36 and 37 have bodies with the same uniform diameter along the length of each roller. Each roller can rotate about a longitudinal axis which is situated on the roll surface in a tangential plane which is parallel to the axis of rotation of the rolling mill roll. The provision of rollers 36 and 37 which are pivotably supported by shafts 41 allows vertical translation of the housing 32 relative to the curved surface 12 so that housing 32 contacts the surface 12 whereby the perpendicular distance between the curved surface and the light producing means 10 as well as detectors 14, 16 and 18 will not change as a function of the diameter of the curved surface. The apparatus of the present invention is positioned by three (3) tangent points of contact with surface 12, i.e., contact with rollers 36 and 37 and therebetween with housing 32 at tangent point 32A to maintain the perpendicular distance constant between means 10 and detectors 14, 16, and 18. The mounting fixture 33 can be adjustably positioned through mounting means 35 so that the said perpendicular distance will always remain constant. The rotational axes of rollers 36 and 37 are parallel to the longitudinal axis 20A of curved surface 12 so that the light beam always travels to and from the curved surface within a plane parallel with the axis 20A. Tangent contact point 32A is a point where the angle of incidence lies perpendicular thereto. Because of this relationship of parts, the diameter of the curved surface will not affect the angle of specular reflectance and, thus, other measurements of reflected light. A handle means 1 may also be disposed on one surface of the housin 32 to aid in movement and positioning of the instrument on the curved surface.

In use, the apparatus may be used to evaluate the roll surface finish during machining of the roll, before a roll changing operation, or when the roll is still in the roll stand in the mill between the rolling of coils of strip. It is to be understood that the roll surface under investigation must be cleaned to remove all traces of rolling solution which is conventionally sprayed onto the roll and/or strip during the rolling process. By positioning the meter 20 upon the roll surface 12 with the lengthwise direction of the rollers 36 and 37 parallel to the axis of rotation of the roll or central axis of a coil of strip, the apparatus is thereby capable of measuring the required parameters to calculate values for the quantities of specular reflectance, 2 degree haze, 5 degree haze, and 15 degree haze. The measurements may be repeated on a regular basis to create a quantitative and objective evaluation of the quality of the roll body surface and/or coiled strip.

Figure 3:
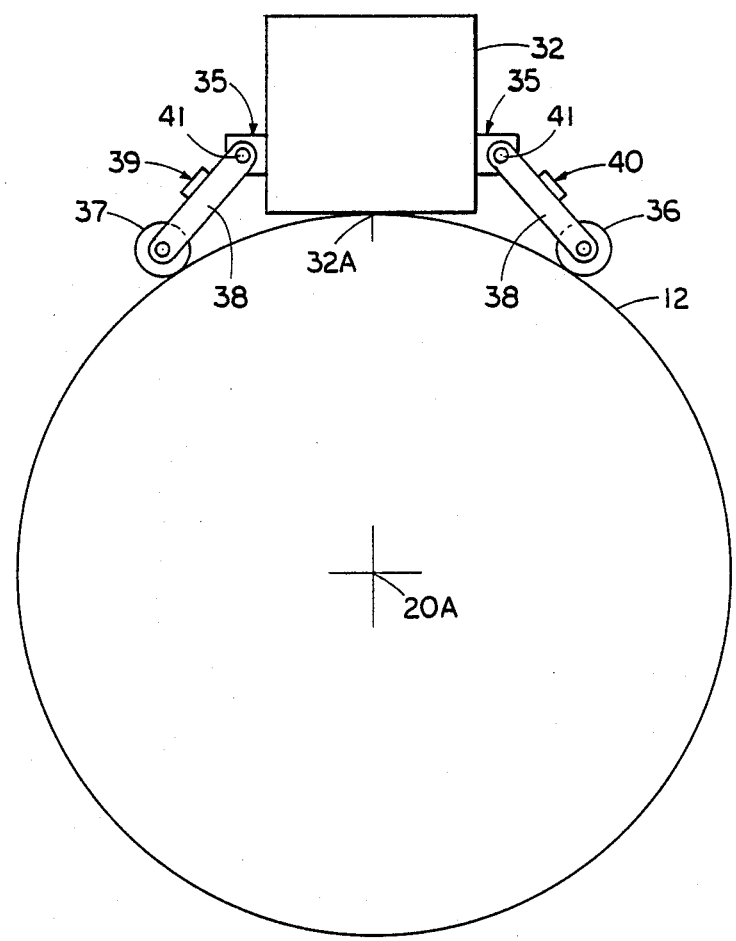
FIG. 3 is an elevational view of the embodiment shown in FIG. 2.

While the present invention has been described in connection with the preferred embodiments shown in FIGS. 1-3, it is understood that other similar embodiments may be used or modifications and additions may be made to the described embodiments for performing the same functions of the present invention without deviating therefrom. Therefore, the present invention should not be limited to any single embodiment, but rather construed in breadth and scope in accordance with the recitation of the appended claims.

What is claimed is:

1. Apparatus for inspecting a curved roll surface of a roll for a rolling mill, said apparatus including:
    mounting means engageable along each of spaced apart tangent planes with said curved roll surface and along a third tangent plane intermediate the spaced apart tangent planes, said tangent planes being generally parallel to a rotational axis of said roll;
    a light producing and detecting means positioned above said roll surface by said mounting means for determining values indicative of the smoothness of the curved roll surface; and
    said mounting means being adjustably positioned to maintain a fixed perpendicular distance between the curved surface and the light producing and detecting means regardless of the curvature of the surface.

2. The apparatus of claim 1 wherein said mounting means includes at least two stabilizing rollers for contacting with said curved roll surface, the longitudinal axes of said stabilizing rollers and said rotational axis of said roll being parallel, with said light producing and detecting means being in a plane containing said rotational axis of said roll.

3. Apparatus for inspecting a curved surface spaced from a central axis of the curved surface, said apparatus including:
    mounting means engageable along each of spaced apart tangent planes with said curved surface and engageable along a third tangent plane located intermediate the spaced apart tangent planes, said tangent planes being generally parallel to said central axis;
    light producing means positioned by said mounting means above said curved surface for emitting a light beam at a predetermined incident angle onto said curved surface;
    light detecting means positioned by said mounting means at a predetermined incident angle from said curved surface for measuring the intensity of light reflected by said curved surface from said light producing means;
    said mounting means being adjustably positioned to maintain a fixed perpendicular distance between the curved surface and the light producing means regardless of the radius of curvature of the surface; and
    means responsive to an output signal from said light detecting means for producing electrical signals corresponding to said output signal.

4. The apparatus of claim 3 wherein said light producing means includes a halogen quartz lamp.

5. The apparatus of claim 3 further including display means responsive to said electrical signals for producing an alpha numeric display and hardcopy record corresponding to the signals.

6. The apparatus of claim 5 further including switch means for selecting an electrical signal from a plurality of electrical signals which correspond to measured values of the intensity of the light beam reflected by said curved surface.

7. The apparatus of claim 3 wherein said mounting means includes stabilizing rollers for contacting said curved surface, standoff arms for supporting said stabilizing rollers, a housing secured to said standoff arms for spaced apart support of said stabilizing rollers at a parallel spaced apart relation, the longitudinal axes of said stabilizing rollers being parallel to said central axis of said curved surface.

8. The apparatus according to claim 7 wherein said housing supports said light producing means and light detecting means for detecting specular reflectance of the light beam by said curved surface between said rollers.

9. The apparatus according to claim 7 wherein said rollers include arbors at opposite ends thereof for support by said standoff arms.

10. The apparatus according to claim 7 wherein said third tangent plane is a contact point with said housing between said stabilizing rollers.

11. Method for quantitatively evaluating the finish of a curved surface spaced at a generally uniform distance from a central axis, said method including the steps of:
    establishing three support sites for a housing on said curved surface to arrange a light beam emitter and a plurality of light sensors supported by this housing to direct a light beam within a plane containing said axis at a predetermined incident angle onto said curved surface;

adjustably positioning a plurality of sensors within said plane at a fixed perpendicular distance above said curved surface and which fixed perpendicular distance does not change as a function of the surface radius of curvature to receive and measure the intensity of reflected light by said curved surface at a plurality of sites defined by the positions of said plurality of sensors within said plane;

producing a plurality of electrical signals corresponding to the ratios of the intensity of the reflected light incident on said sensors; and selectively displaying said electrical signals.

* * * * *